(12) United States Patent
Sitter et al.

(10) Patent No.: US 6,325,463 B1
(45) Date of Patent: Dec. 4, 2001

(54) VENT SYSTEM FOR AN AXLE AND HUB ASSEMBLY

(75) Inventors: Don Sitter, Prattville, AL (US); Kent Davison, Columbia City; Martin G. Blessing, Fort Wayne, both of IN (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/448,923

(22) Filed: Nov. 23, 1999

(51) Int. Cl.$^7$ ..................................................... B60B 35/00
(52) U.S. Cl. ..................................... 301/124.1; 301/108.1
(58) Field of Search .............................. 301/105.1, 124.1, 301/137; 55/495, 505, 507

(56) References Cited

U.S. PATENT DOCUMENTS

| | | | |
|---|---|---|---|
| 3,203,158 | * | 8/1965 | Zadra ...................................... 55/495 |
| 4,557,526 | * | 12/1985 | Smith ................................. 301/124.1 |
| 4,595,118 | * | 6/1986 | Azuma et al. ........................ 220/374 |
| 4,921,512 | * | 5/1990 | Maryyanek et al. ................ 55/507 X |
| 5,024,345 | * | 6/1991 | Deweerdt ............................ 220/366 |
| 5,098,168 | * | 3/1992 | Johnson ............................ 301/124.1 |
| 5,190,355 | * | 3/1993 | Hobbie et al. ................ 301/108.1 X |
| 5,192,117 | | 3/1993 | Kuck . |
| 5,492,393 | | 2/1996 | Peisker et al. . |
| 5,505,525 | | 4/1996 | Denton . |
| 5,538,330 | * | 7/1996 | Erlich ................................. 301/124.1 |
| 5,664,846 | * | 9/1997 | Kuck .................................. 301/108.1 |
| 5,752,746 | | 5/1998 | Perry . |
| 5,785,390 | | 7/1998 | Gold et al. . |
| 5,891,223 | * | 4/1999 | Shaw et al. ......................... 55/505 X |
| 6,024,417 | * | 2/2000 | Jones, II et al. ................... 301/124.1 |

OTHER PUBLICATIONS

Product Literature, Stemco Inc., Vented Hub Cap, 1996, 4 pages.

* cited by examiner

*Primary Examiner*—Russell D. Stormer
(74) *Attorney, Agent, or Firm*—Liniak, Berenato, Longacre & White

(57) ABSTRACT

A vent system for a wheel hub comprising a first filtered vent at the wheel end cavity and a second vent formed by a one-way, pressure relief valve venting the axle tube to atmosphere. The vent system defines a vent path from the wheel end cavity through a first, preferably filtered, vent into the axle tube then through a second check valve connecting the axle tube to atmosphere. A porous material is positioned to cover the vent passage at the wheel end cavity for allowing a flow of gases to enter and exit the vent passage while preventing liquids and other contaminants from traveling therethrough. The porous material is held in place over the vent by a snap ring or other suitable retention system disposed within the vented plug member. The second axle tube vent is disposed along the axle tube to vent the tube itself to atmosphere with pressure relief

14 Claims, 3 Drawing Sheets

VENT SYSTEM FOR AN AXLE AND HUB ASSEMBLY

BACKGROUND OF THE INVENTION

1. Technical Field

The present invention relates to an venting system and more particularly to an venting system for use with a wheel bearing and lubrication system.

2. Background Art

In translational and rotational devices generally and particularly on the wheels of most vehicles such as trucks and trailers, hubcaps are used to maintain oil or grease in the wheel bearings. In addition, hubcaps help exclude external contaminants and prevents them from coming into contact with the wheel bearings within the wheel hub cavity. External contaminants can substantially shorten the life of the wheel bearings.

The interior of the wheel hub cavity is partially filled with oil or grease so that the wheel bearings are lubricated. Friction resulting from the rotating bearings heats the lubricant and the air space within the hubcap causing the enclosed lubricant and air to expand, thereby increasing ambient pressure in the cavity. The characteristic "pumping" action normally associated with the operation of the oil seals used with wheel bearings further tends to raise the ambient pressure. This increased pressure in the wheel hub cavity can become great enough to damage related components such as the oil seal the seal between the hubcap and the wheel hub or even the hubcap itself. Damage to these components can cause leakage of lubricant from the wheel hub cavity and hubcap, resulting in insufficient bearing lubrication.

Moreover, with non-driving axles having hollow spindles, there is a tendency for moisture and condensation to build up in the axle tube during use. That moisture in the axle tube is sometimes forced out of the tube at the spindle end and into the wheel hub cavity when the axle tube is tilted or when pressure builds up in the axle tube. Thus, while the hub cap may prevent entry of some contaminants, it does not prevent the build up of moisture and debris in the axle tube and the wheel end cavity.

Accordingly, it has been necessary to incorporate a venting device at the wheel end assembly to relieve the pressure developed within the wheel hub cavity and to permit moisture to escape. Prior attempts to address these problems have used valve elements positioned in a vent passage formed in the hubcap for permitting air to pass through the vent, in order to reduce internal pressure, while excluding passage of contaminants. However, these valve vent devices also permit lubricant flow out of the hubcap during venting, this results in excessive loss of lubricant over time. In addition, these devices are often unduly complicated because they utilize numerous parts and, therefore, are relatively expensive to manufacture.

Other devices attempt to vent a bearing housing while preventing the flow of lubricant from the bearing housing. Prior attempts includes a hubcap with a vent including a vent passage filled with a cylindrical gas permeable plug of bronze porous material which permits air to pass therethrough but assertedly prevents water and other contaminants from passing therethrough. However, these devices are secured in a vent passage formed in the hubcap via an interference or press fit which requires precision machining to ensure the low tolerances necessary for a secure fit. It is well known, however, that precision machining also results in increased manufacturing costs. Further, the outer surfaces of the prior art vent plugs are directly exposed to the outside work environment and therefore may become undesirably blocked by grit and other contaminants, severely hindering the venting action of the porous material.

As an alternative, a prior art vented hub cap has been provided with a combination of valves at the hub cap, wherein an external check valve relieves pressure and an internal valve remains tightly sealed to prevent lubricant from leaking out and contamination from flowing in.

As seen from the foregoing, there is a need for a vent system for the wheel end assembly which permits air to pass therethrough but which prevents the passage of water and other contaminants, wherein the venting device can be simply and inexpensively manufactured and secured to the wheel end assembly. Moreover, the need exists for a venting system that avoids pressure build-up and that equilibrates the pressure between the axle tube and atmosphere.

SUMMARY OF THE INVENTION

It is a primary object of the present invention to overcome the aforementioned shortcomings associated with the prior art by providing a filtered vent at the axle tube or wheel end cavity that is easy to install, inexpensive to manufacture yet effective in operation.

Another object of the present invention is to provide a filtered venting system that is contained within the axle and spindle, wherein the system allows the use of simple and inexpensive non-vented hub caps.

Another object of the present invention is to provide a filtered vent which prevents the build-up of debris and moisture or loss of lubricant from within the wheel hub cavity to thereby ensure that the wheel bearings remain lubricated at all times.

Yet another object of the present invention is to provide a filtered vent at the wheel end cavity and further provide a vent from the axle tube to atmosphere with pressure relief to relieve the pressure developed within the wheel hub cavity while preventing water and other contaminants from entering the hub cavity.

It is also an object of the present invention to provide a vented spindle plug formed of a porous material and affixed to the spindle end by an enclosure that is easily manufactured and incorporated into existing structures.

Another object of the present invention is to provide a vented spindle plug for a wheel end assembly, which maintains bi-directional air flow through the vent substantially free from blockage by contaminants that might be caused by operation of the wheel.

It is still another object of the present invention to provide a vented plug formed of porous material which includes an enclosure encasing the porous material in order to shield the porous material from grit and other contaminants.

These as well as additional objects and advantages of the present invention are achieved by providing a filtered vent at the wheel end cavity (i.e., the filtered spindle plug) as well as a second one-way, check valve vent directly from the axle tube to atmosphere to provide pressure relief. The filtered passage extending through the spindle plug and the vented axle tube equalize the pressure between the wheel hub cavity and the outside environment. The filtered spindle plug is provided with a porous material which allows a flow of gases through the passage while preventing liquids and other contaminants from traveling therethrough, wherein the axle tube is further provided with a vent to the atmosphere through a one-way pressure relief valve located in the axle tube.

BRIEF DESCRIPTION OF THE DRAWINGS

FIG. 2 shows a conventional hollow, non-driving wheel assembly comprising a hollow spindle and a hub cap attached to the wheel hub via bolts or the like;

DETAILED DESCRIPTION OF A PREFERRED EMBODIMENT

Figure 1:
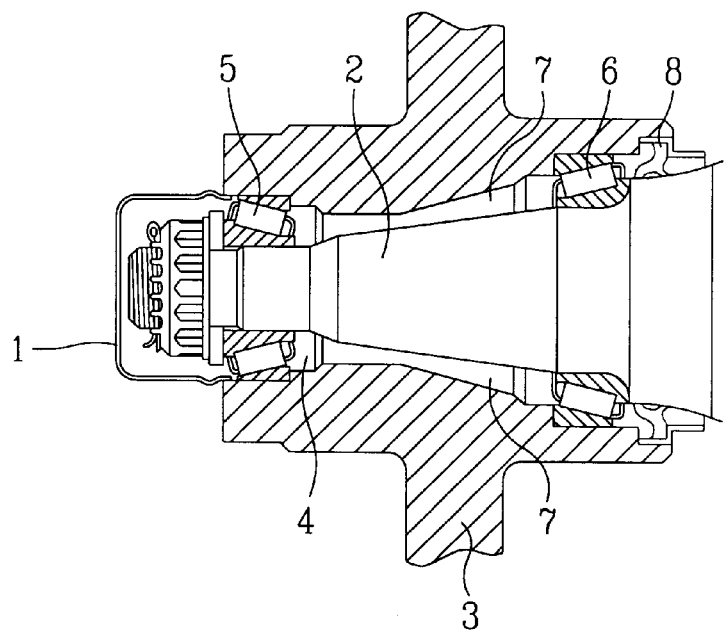
FIG. 1 is a cross sectional view of the conventional wheel end assembly.
Figure 2:
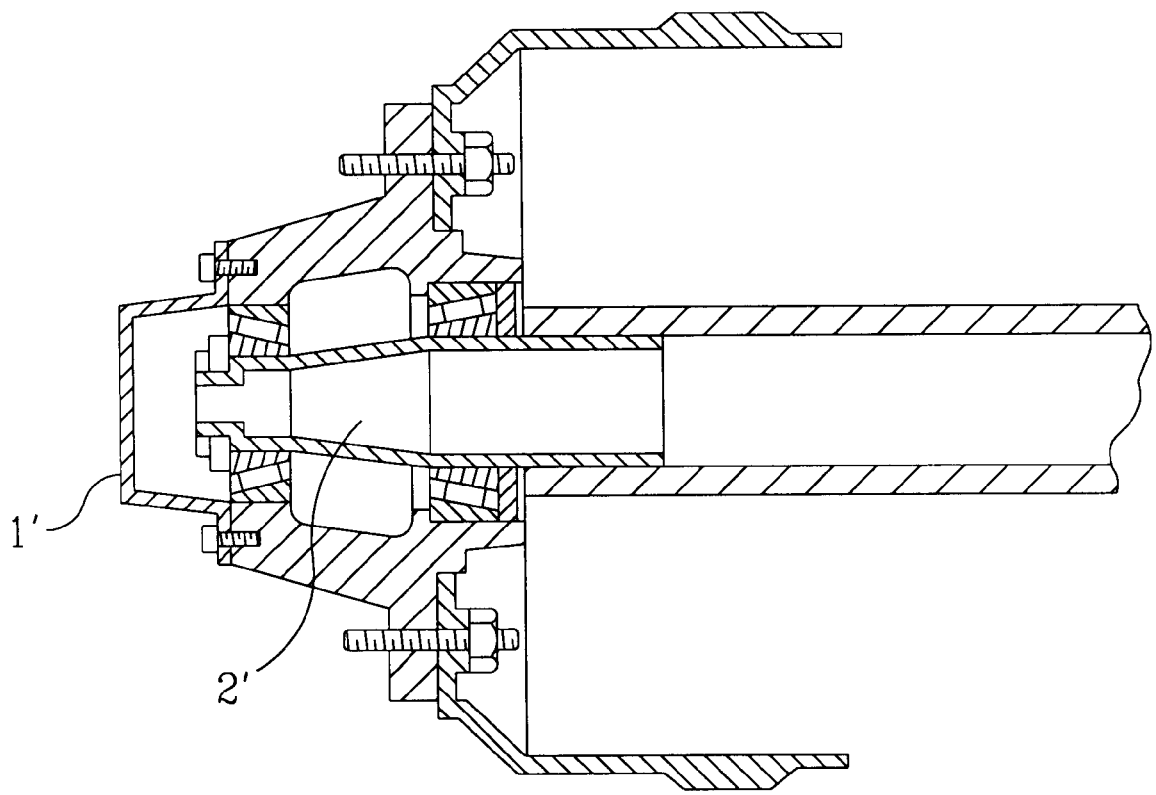

FIG. 1 shows a conventional freewheeling or non-driving wheel bearing assembly for a front or rear axle of a vehicle. As shown in FIG. 1, two tapered wheel bearings 5, 6 allow the hub 3 and wheel (not shown) to rotate around a stationary solid spindle 2. Grease or lubricant 4 partially fills the hub to lubricate the bearings 5, 6, and the seal 8 prevents loss of lubricant. A dust cap or hub cap 1 fits over the outer end of the hub to keep the grease in and road dirt out of the bearings 5, 6 and the wheel end cavity 7. FIG. 2 shows a conventional hollow, non-driving wheel assembly comprising a hollow spindle 2' and a hubcap 1' attached to the wheel hub via bolts or the like. With this conventional design, the vented hubcap 1' or a vented plug has been disposed at the end of the hollow spindle.

Figure 3:
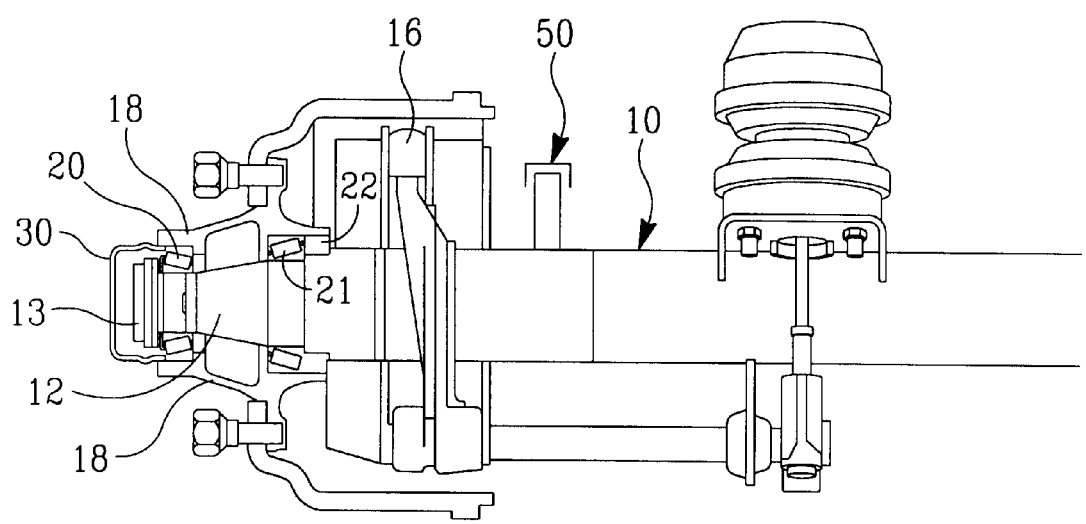
FIG. 3 is a sectional view of the axle tube and wheel end assembly of this invention.
Figure 4:
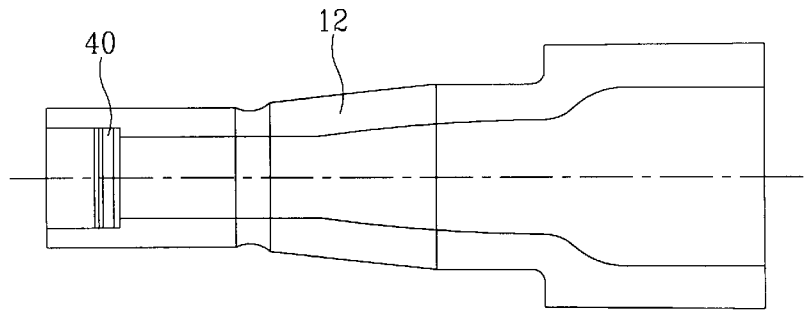
FIG. 4 is an enlarged cross sectional view of the spindle and spindle plug assembly according to one embodiment of this invention.

FIG. 3 shows a non-driving axle consisting of a tube and hollow spindles as shown in FIG. 4. The spindles 12 are typically fitted with a plug having a small hole in the center. With this axle design, there is a tendency for moisture and condensation to collect within the axle tube and spindle. The build-up of moisture may cause corrosion of the axle tube. Further, the moisture tends to leak from the axle tube to the wheel end cavity through the hole in the spindle plug when the vehicle is on an incline (side-to-side) or it tends to be forced out of the axle tube by a pressure build-up.

Friction resulting from the rotating bearings 5, 6 heats the lubricant 4 and the air space within the wheel end assembly and axle tube causing the enclosed lubricant 4 and air to expand, thereby increasing ambient pressure in the cavity. Pressure also builds up inside the axle tube. The characteristic "pumping" action normally associated with the operation of the oil seals used with wheel bearings further tends to raise the ambient pressure. Moreover, the pressure build-up in the axle tube forces the moisture out of the axle tube and into the wheel end cavity.

Referring now to FIGS. 3 and 4, the vent system of the present invention is illustrated for conventional use, for example, on a vehicle, such as a tractor or a trailer, having wheels, which are each rotatably connected to an end of an axle via bearings. The axle tube 10 and spindle 12 are disposed along an axis of rotation 'x—x'. A conventional brake spider 16 is provided adjacent the axle tube 10 and a hub assembly 18 is rotatably mounted on the spindle 12 via a pair of wheel bearings 20, 21 disposed between the spindle 12 and the hub assembly 18. A spindle nut 13 is threadingly disposed on the spindle end and the nut 13 serves to as a bearing adjuster for applying a preload force to the bearing 20. Lubricant is disposed adjacent the wheel bearings 20, 21 and a lubricant seal 22 prevents loss of lubricant. A hubcap 30 mounts onto a wheel hub and functions to contain lubricant for lubricating the bearings during operation of the wheel, hub and bearings. As will be described in greater detail below, a check valve 50 is disposed along the axle tube 10 and that check valve 50 vents the wheel end assembly through the filtered spindle plug assembly 40 to atmospheric pressure.

Figure 5B:
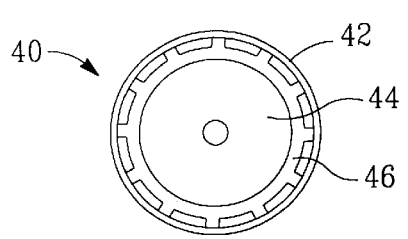
FIG. 5b is a front view of the spindle plug assembly of FIG. 5a in the assembled state.
Figure 5A:
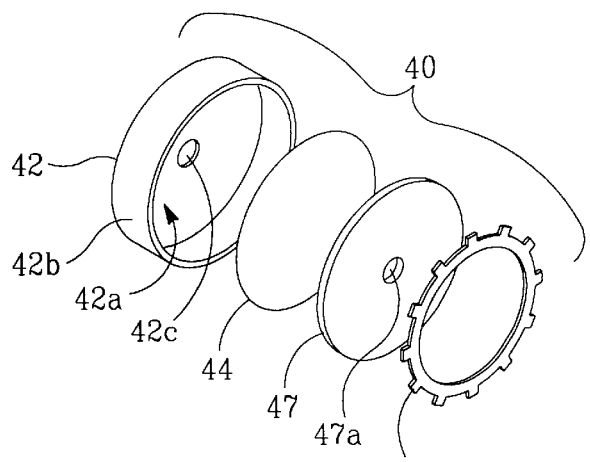
FIG. 5a is an exploded view of one embodiment of the spindle plug assembly according to this invention.

In the manner shown in FIG. 4, a spindle plug assembly 40 is mounted or press-fit to the end of the hollow spindle 12 and the spindle plug assembly 40 serves to close the end of the passageway leading to the axle tube 10. As shown in FIG. 5a and 5b, the spindle plug assembly 40 comprises a cup-shaped spindle plug 42, a filter member 44, non-porous disk 47, and a clip retainer 46. The spindle plug 42 is formed with recess 42a defined by walls 42b as well as a vent passage 42c. The filter member 44 is sized to fit within the recess 42a and cover the vent passage 42c. The non-porous disk 47 is formed with a center hole 47a for passage of air, and the non-porous disk 47 keeps the porous disk 44 from becoming oil-soaked. The clip retainer 46 is preferably formed as a ring that provides a snap fit connection to the cup-shaped spindle plug 42 to thereby retainer the filter member 44 within the recessed portion 42a. The filtered spindle plug serves two purposes; first to vent the wheel hub cavity to atmosphere (via the axle tube vent) and, second, to prevent contaminants from entering the axle tube. The venting property avoids damage to the wheel seal that might be caused by excessive positive and/or negative pressure in the wheel hub cavity. In addition, vented cap 40 prevents external contaminants such as grit and water from entering the wheel hub cavity.

Figure 6A:
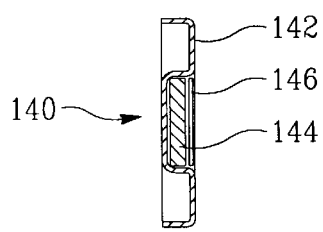
FIG. 6a is a cross sectional view of a second embodiment of the spindle plug assembly.
Figure 6B:
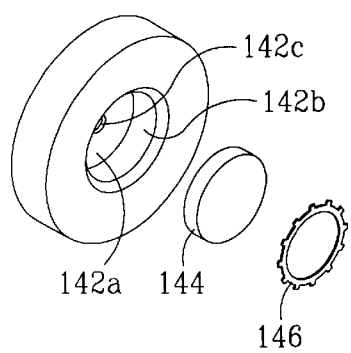
FIG. 6b is an exploded view of one embodiment of the spindle plug assembly according to this invention.
Figure 7:
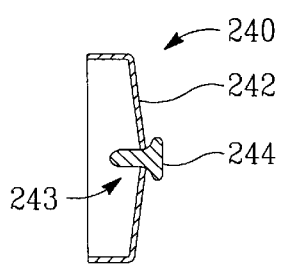
FIG. 7 is a cross sectional view of a third embodiment of the spindle plug assembly.

FIGS. 6a, 6b and 7 show alternate embodiments of the spindle plug assembly designed to protect the porous plastic member from oil contamination. The spindle plug assemblies of FIGS. 6a, 6b and 7 are designed with a filter section of smaller diameter to limit exposure of the filter member to oil. FIGS. 6a and 6b show a spindle plug assembly 140 comprising a cup-shaped spindle plug 142, a filter member 144 and a spring-clip retainer 146. The spindle plug 142 is formed with recess 142a defined by walls 142b as well as a vent passage 142c. The filter member 144 is sized to fit within the recess 142a and cover the vent passage 142c. The clip retainer 146 is preferably formed as a resilient spring-like member that provides a snap fit connection to the cup-shaped spindle plug 142 to thereby retainer the filter member 144 within the recessed portion 142a.

FIG. 7 shows a third spindle plug assembly 240 comprising a cup-shaped spindle plug 242, and a porous plug-shaped filter member 244. The spindle plug 242 is formed with a central vent passage 243. The plug-type filter member 244 is press-fit into the passage 243.

As shown in FIG. 3, significant to the vent system of the present invention is the one-way, check valve 50 located on the axle tube 10 which vents the wheel end assembly through the filtered spindle plug assembly 40 to atmospheric pressure. Therefore, the vent system of this invention is not susceptible to fouling or contamination when, for example, the axle runs through water. The hubcap 30 does not include a vent and is not otherwise altered to provide communication between the wheel end assembly and atmosphere. Instead, the wheel end assembly of this invention is vented through the spindle plug assembly 40 to atmosphere through the one-way check valve 50 disposed on the axle tube 10. The exact height and position of the one-way check valve 50 is chosen depending on the environment of use of the vehicle. A vehicle that often runs through deep water will require a check valve 50 position relatively high above the axle. The important feature of this invention is the ability to vent the wheel end assembly through a first, preferably filtered, vent 40 at the end of the axle tube and then through a second vent 50 to atmosphere. To this end, a hose may extend from the check valve 50 to raise or adjust the effective height and position of the check valve 50 in a convenient and economical manner.

As previously discussed, it is common for moisture or condensation to enter the axle tube 10. The moisture or condensation may build up within the axle tube and cause corrosion. In addition, when the vehicle is on an incline, the accumulated water may exit the axle tube and enter the wheel end assembly. When this occurs, the water and moisture contacts the wheel bearing assembly, lubricant, and associated seals thereby causing damage.

The filter member 44 is preferably a flexible porous disk or sheet positioned across the inner surface of the recess 42a and covering the vent passage 42c. The porous sheet 44 includes pores or interstices of a size sufficient to prevent the flow of liquids, such as lubricant and water, therethrough while permitting the flow of gases therethrough. The porous sheet 44 is oleophobic, and correspondingly hydrophobic, and functions to contain the lubricant within chamber while allowing air to pass to and from chamber through vent passage 46. To achieve this function, the porous sheet 44 is preferably comprised of a non-metallic material, such as a porous plastic member, or a porous expanded membrane of polytetrafluoroethylene (PTFE) in the form of a disc having a pore size in the microporous size range. Such membranes have a pore size in the 0.045 micron size range or smaller, and maintain a watertight seal while permitting an enclosure to "breathe".

The enclosure device of the spindle cap 42 of the present invention effectively shields the porous venting sheet 44 from contaminants such as grit. The accumulation of grit on the surface of the porous sheet 44 could reduce its permeability thus impairing its ability to vent the wheel hub cavity while possibly requiring frequent replacement of the porous sheet 44. Therefore, the enclosure of the present invention is useful in extending the duration for which the porous sheet 44 remains permeable to air.

As can be seen from the foregoing, a vent system formed in accordance with the present invention will relieve pressure developed within the wheel hub cavity, by venting, while preventing water and other contaminants from entering the hubcap and contacting the wheel bearings. This will extend, effectively, the useful life of the lubricant and bearings. Moreover, by forming the vent system in accordance with the present invention, an enclosure is provided which is useful in preventing grit and other contaminants from accumulating on the surface of the venting structure thereby maintaining the air flow vent path and ensuring proper venting of the wheel end assembly. Additionally, a vent system formed in accordance with the present invention will enable materials to be used for venting which do not need to rely upon an interference fit within the vent passage thereby resulting in a simple, inexpensive yet effective vented wheel end assembly.

While the foregoing invention has been shown and described with reference to a preferred embodiment, it will be understood by those of skill in the art that various changes in form and detail may be made therein without departing from the spirit and scope of the present invention.

What is claimed is:

1. A vent system for a wheel hub assembly having lubricated wheel bearings, said vent system comprising:
   an axle tube having an open end and a longitudinal passageway extending along said tube;
   a first vent disposed adjacent said open end of said axle tube, said first vent communicating with a substantially closed chamber housing lubricant for the wheel bearings;
   a second vent disposed along said axle tube and venting said longitudinal passageway, wherein a vent path extends from said substantially closed chamber through said first vent to said second tube vent.

2. The vent system of claim 1, wherein said first vent is a filtered vent that filters air passing through said first vent.

3. The vent system of claim 1, wherein said second tube vent relieves pressure within said axle tube.

4. The vent system of claim 1, wherein said second tube vent comprises a one way pressure relief valve passing through said axle tube and connecting said passageway to atmosphere.

5. The vent system of claim 1, wherein said axle tube comprises a spindle portion for receiving said wheel bearings and a wheel hub.

6. The vent system of claim 2, wherein said filtered vent includes a vent passage extending through a spindle plug assembly disposed at said open end of said axle tube and a porous material supported on said spindle plug assembly for allowing a flow of gases to enter and exit said substantially closed chamber through said vent passage while preventing liquids and other contaminants from flowing into said substantially closed chamber and lubricant from flowing out of said substantially closed chamber.

7. The vent system of claim 6, further comprising a fastener to attach said porous material to said spindle plug assembly.

8. The vent system of claim 7, wherein said fastener is an annular clip for securing said porous material in position over said vent passage, said porous material being positioned between said fastener and said vent passage.

9. The vent system of claim 1, wherein said porous material comprises a porous plastic member disposed within said first vent for preventing the passage of grit and other contaminants to said porous material to thereby prevent the accumulation of external contaminants on said filter.

10. The vent system of claim 1, wherein said first vent comprises an annular member having a central aperture and a porous filter member disposed adjacent said central aperture, wherein said porous filter member has a smaller diameter than said annular member to thereby prevent oil contamination of said porous filter member.

11. A method of venting a wheel hub assembly having lubricated wheel bearings, said method comprising the steps of:
   providing an axle tube having an open end and a longitudinal passageway extending therethrough;
   rotatably mounting a wheel hub on said axle tube through at least one wheel bearing to thereby form a substantially closed chamber housing lubricant for said at least one wheel bearing;
   providing a first vent disposed adjacent said open end of said axle tube, said first vent communicating with said substantially closed chamber;

providing a second vent disposed along said axle tube and venting said longitudinal passageway, wherein a vent path extends from said substantially closed chamber through said first vent and said second tube vent.

12. The method of claim 11, further comprising the step of mounting a hub cap member adjacent said open end to thereby, in part, form said substantially closed chamber.

13. The method of claim 11, further comprising the step of providing a filter member on said first vent for allowing a flow of gases to enter and exit said substantially closed chamber through said vent passage while preventing liquids and other contaminants from flowing into said substantially closed chamber and lubricant from flowing out of said substantially closed chamber.

14. The method of claim 11, wherein said vent path vents said substantially closed chamber and said passageway to atmosphere.

* * * * *